(12) United States Patent
Yuan et al.

(10) Patent No.: US 11,809,454 B2
(45) Date of Patent: Nov. 7, 2023

(54) LABEL-BASED DOCUMENT CLASSIFICATION USING ARTIFICIAL INTELLIGENCE

(71) Applicant: International Business Machines Corporation, Armonk, NY (US)

(72) Inventors: Zhong Fang Yuan, Xi'an (CN); Tong Liu, Xi'an (CN); Li Juan Gao, Xi'an (CN); Ming Jin Chen, Zhe Jiang (CN); Ke Yong Zhang, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 231 days.

(21) Appl. No.: 17/100,864

(22) Filed: Nov. 21, 2020

(65) Prior Publication Data

US 2022/0164370 A1    May 26, 2022

(51) Int. Cl.
*G06F 16/00* (2019.01)
*G06F 16/28* (2019.01)
*G06F 40/30* (2020.01)
*G06F 40/117* (2020.01)
*G06N 20/00* (2019.01)

(52) U.S. Cl.
CPC ........ *G06F 16/285* (2019.01); *G06F 40/117* (2020.01); *G06F 40/30* (2020.01); *G06N 20/00* (2019.01)

(58) Field of Classification Search
CPC ...... G06F 16/285; G06F 40/117; G06F 40/30; G06N 20/00
See application file for complete search history.

(56) References Cited

U.S. PATENT DOCUMENTS

| | | | |
|---|---|---|---|
| 7,937,263 B2 | 5/2011 | Carrier | |
| 8,699,789 B2 | 4/2014 | Gordo | |
| 8,838,614 B2 | 9/2014 | Koperda | |
| 9,552,570 B2 | 1/2017 | Morimoto | |
| 10,089,576 B2* | 10/2018 | Gao | G06N 3/0454 |
| 11,049,044 B1* | 6/2021 | Habenschuss | G06N 3/08 |

(Continued)

FOREIGN PATENT DOCUMENTS

| | | |
|---|---|---|
| CN | 107943856 A | 4/2018 |
| CN | 110532377 A | 12/2019 |

(Continued)

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Leslie Wong
(74) *Attorney, Agent, or Firm* — Michael A. Petrocelli (57) ABSTRACT

Label-based document classification using artificial intelligence includes collecting, by one or more processors, a plurality of pre-trained classification models into a model pool and a plurality of documents into a document pool. The collected plurality of pre-trained classification models are applied in parallel to the plurality of documents in the document pool to generate a list of labels. Based on the list of labels, a final label result is generated according to which a baseline algorithm for document classification is generated by the one or more processors.

17 Claims, 6 Drawing Sheets

(56) References Cited

U.S. PATENT DOCUMENTS

| | | | |
|---|---|---|---|
| 11,429,893 B1* | 8/2022 | Tong | G06N 5/04 |
| 2016/0078022 A1* | 3/2016 | Lisuk | G06N 20/00 |
| | | | 706/12 |
| 2017/0177627 A1 | 6/2017 | Singh | |
| 2019/0392250 A1* | 12/2019 | Aggarwal | G06F 40/284 |
| 2020/0279105 A1* | 9/2020 | Muffat | G06N 3/08 |
| 2021/0334955 A1* | 10/2021 | Roth | G06T 7/11 |
| 2022/0061236 A1* | 3/2022 | Guan | G06N 3/0445 |
| 2022/0138423 A1* | 5/2022 | Zhu | G06F 40/30 |
| | | | 704/9 |
| 2022/0164946 A1* | 5/2022 | Pati | G06T 7/0012 |

FOREIGN PATENT DOCUMENTS

| | | | | |
|---|---|---|---|---|
| CN | 110705296 A | * | 1/2020 | |
| CN | 111008329 A | * | 4/2020 | |
| CN | 110832596 B | * | 3/2021 | G01G 19/393 |
| WO | WO-2020204535 A1 | * | 10/2020 | G06F 16/35 |

OTHER PUBLICATIONS

Zhu, et al., "Learning to Classify Short Text with Topic Model and External Knowledge", 6th International Conference, KSEM 2013, LNAI 8041, pp. 493-503.

* cited by examiner

LABEL-BASED DOCUMENT CLASSIFICATION USING ARTIFICIAL INTELLIGENCE

BACKGROUND

The present invention generally relates to the field of artificial intelligence (AI), and more particularly to categorizing documents based on a series of labels created using machine learning techniques.

A goal of current cognitive capture systems is to "read" documents like a human, to identify and classify the type of document and extract key data. Cognitive capture systems aim to efficiently and accurately convert the varied content different documents (i.e., sources) contain into standard data types, scanning for relevant information and feeding that information into common data stores. However, these systems are frequently affected by cold-start problems associated with machine learning algorithms and techniques.

SUMMARY

Shortcomings of the prior art are overcome and additional advantages are provided through the provision of a computer-implemented method for document classification that includes collecting, by one or more processors, a plurality of pre-trained classification models into a model pool and a plurality of documents into a document pool. The collected plurality of pre-trained classification models are applied in parallel to the plurality of documents in the document pool to generate a list of labels. Based on the list of labels, a final label result is generated, and responsive to the final label result, a baseline algorithm for document classification is generated by the one or more processors.

Another embodiment of the present disclosure provides a computer program product for document classification, based on the method described above.

Another embodiment of the present disclosure provides a computer system for document classification, based on the method described above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Cognitive capture systems oriented to document classification or categorization are often affected by cold-start problems typical of machine learning algorithms and techniques. Cold-start is a potential problem in artificial intelligence (AI) which involves a degree of automated data modelling. Specifically, cold-start problems are associated with the issue that an AI-based computer system cannot draw any inferences for users or items about which it has not yet gathered sufficient information.

Accordingly, cold-start problems can further complicate the analysis of documents, particularly of those including a large amount of text (i.e., long documents). Long documents can also include documents with several chapters, tables and/or figures. Frequently, long documents lack corresponding annotations based on which baseline models can be built with acceptable performance. Traditional methods to annotate or label documents include data crowdsourcing (i.e., crawlers) which allows systems to crawl data and quickly label a batch of small-scale data for system use. However, this method can only be applied to, for example, natural language processing (NLP) or computer vision (CV) problems which can be crowdsourced. Additionally, crowdsourcing has high costs, and can produce mismatches between labeled data and real data. Another option could be using a semantic similarity matching technique with unsupervised learning; however, semantic drift becomes a problem with this method, especially for documents including a large amount of text data (i.e., long documents).

Therefore, embodiments of the present invention provide a method, system, and computer program product for label-based document classification using artificial intelligence. The following described exemplary embodiments provide a system, method, and computer program product to, among other things, collect a plurality of pre-trained classification models into a model pool and a plurality of documents into a document pool, generate a series of labels or tags by applying the collected pre-trained classification models to the collected documents to create a prediction model, determine a final tag result by using a weighted voting, and build a baseline algorithm for document classification based on the determined final tag result. Embodiments of the present disclosure may allow computer systems to accurately identify and classify different types of documents and extract key data without delays associated with cold-start problems. Thus, the present embodiments have the capacity to improve the technical field of artificial intelligence by allowing computer systems to build a baseline algorithm for document classification without additional data annotation that can potentially solve cold-start problems.

Accordingly, embodiments of the present disclosure provide a label-based document classification method based on an external model perspective. The external model refers to a model that is trained using external data and is not related with the task. For example, based on a news classification model trained using text classification data obtained from a certain newspaper, a text content can be divided into ten different categories such as entertainment, finance, technology and so on. At a mathematical level, this (external) classification model can be seen as fitting a data distribution discriminant formula. The data distribution discriminant formula assumes that all data are subordinate to one of the ten distributions and can be regarded as one of the ten types, even if the data you input has no connection with these ten categories in human understanding, in the model's view, it can always correspond to one of these categories. Based on this method, for text data without any labels, a large number of models previously trained with external data can be used to label the text data, and then classify documents based on these labels.

Figure 1:
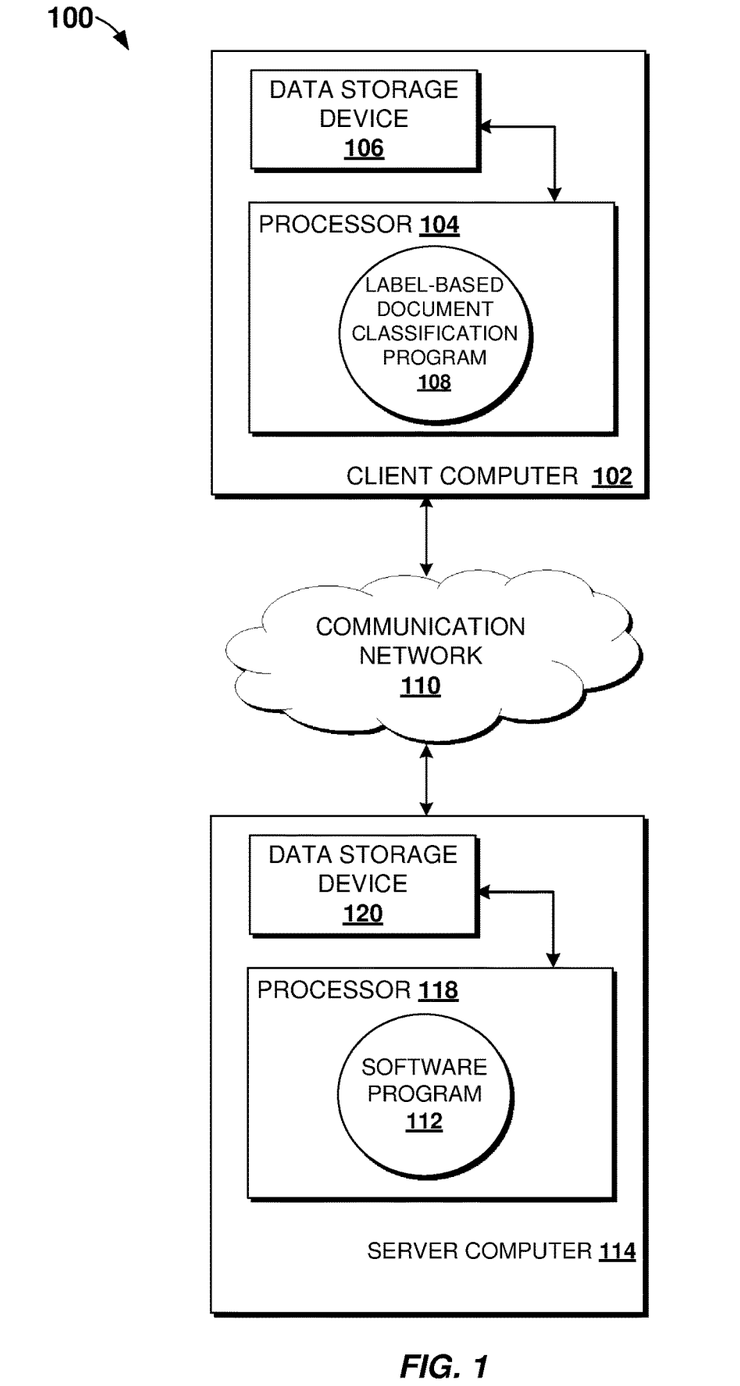
FIG. 1 is a block diagram illustrating a networked computer environment, according to an embodiment of the present disclosure.

Referring now to FIG. 1, an exemplary networked computer environment 100 is depicted, according to an embodiment of the present disclosure. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

The networked computer environment 100 may include a client computer 102 and a communication network 110. The client computer 102 may include a data storage device 106 and a processor 104 that is enabled to run a label-based document classification program 108. Client computer 102 may be, for example, a mobile device, a telephone (including smartphones), a personal digital assistant, a netbook, a laptop computer, a tablet computer, a desktop computer, or any type of computing devices capable of accessing a network.

The networked computer environment 100 may also include a server computer 114 with a data storage device 120 and a processor 118 that is enabled to run a software program 112. In some embodiments, server computer 114 may be a resource management server, a web server or any other electronic device capable of receiving and sending data. In another embodiment, server computer 114 may represent a server computing system utilizing multiple computers as a server system, such as in a cloud computing environment.

The label-based document classification program 108 running on client computer 102 may communicate with the software program 112 running on server computer 114 via the communication network 110. As will be discussed with reference to FIG. 4, client computer 102 and server computer 114 may include internal components and external components.

The networked computer environment 100 may include a plurality of client computers 102 and server computers 114, only one of which is shown. The communication network 110 may include various types of communication networks, such as a local area network (LAN), a wide area network (WAN), such as the Internet, the public switched telephone network (PSTN), a cellular or mobile data network (e.g., wireless Internet provided by a third or fourth generation of mobile phone mobile communication), a private branch exchange (PBX), any combination thereof, or any combination of connections and protocols that will support communications between client computer 102 and server computer 114, in accordance with embodiments of the present disclosure. The communication network 110 may include wired, wireless or fiber optic connections. As known by those skilled in the art, the networked computer environment 100 may include additional computing devices, servers or other devices not shown.

Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the present invention. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present invention.

Figure 2:
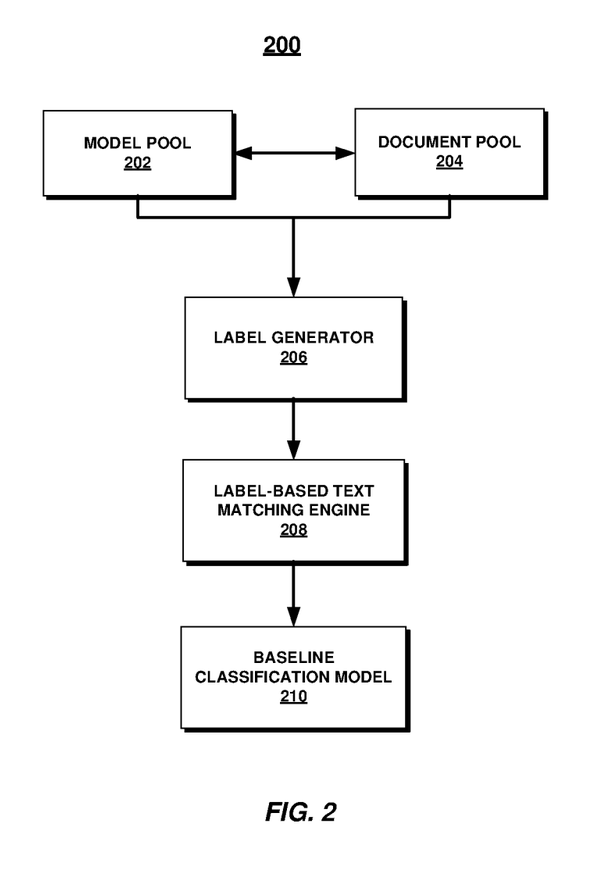
FIG. 2 depicts a system for label-based document classification, according to an embodiment of the present disclosure.

Referring now to FIG. 2, a system 200 for label-based document classification is shown, according to an embodiment of the present disclosure. In this embodiment, the system 200 includes a model pool 202, a document pool 204, a label (or tag) generator 206, a label-based text matching engine 208, and a baseline classification model 210.

The system 200 collects a plurality of pre-trained classification models (hereinafter "pre-trained models") and stores them in the model pool 202. Similarly, the system 200 collects a plurality of documents (hereinafter "documents") and stores them in the document pool 204. According to an embodiment, the document pool 204 includes documents containing a large amount of text data, these documents are also referred to as "long documents". However, documents of any length can be collected in the document pool 204. The pre-trained models can be obtained from different sources such as, for example, GitHub®, Open-source models, and the like. The collected documents may include (real) documents that have been labeled or need to be classified.

The label generator 206 applies, in parallel, the pre-trained models in the model pool 202 to all the documents in the document pool 204 to generate a series of labels or tags. Specifically, the label generator 206 simultaneously applies the pre-trained models in the model pool 202 to all the documents in the document pool 204. By simultaneously applying all of the pre-trained models to the collected documents, classification labels can be generated at the same time rather than one by one.

Predictions on the documents in the document pool 204 are made using a word length N as a sliding window. Thus, the documents in the document pool 204 are used as input for the pre-trained models to get a list of labels or tags. Since the pre-trained models have an input length limitation, the sliding window with word length N is used to obtain text data from the documents, and generate the label list for document classification.

In an embodiment, a final label result can be determined by applying a weighted voting method to the label list obtained from the pre-trained models. After optimizing the weights of the base classifiers, the proposed method combines the results of each classifier according to the weighted voting combination rule. Experimental results show that the proposed method not only improves the classification accuracy, but also has a strong generalization ability and universality. The final label result is generated as a hard tag. In another embodiment a prediction value of all sliding windows can be retained to generate a soft tag. Stated differently, the label list obtained from the pre-trained models can be used as the soft tag.

Accordingly, the labels generated from the pre-trained external models can be used to represent a text document (a long text document or a document of any length).

The label-based text matching engine 208 converts the labels generated by the label generator 206 into a one-hot vector whose length is aligned with the longest label dimension of all the generated labels. As explained above, this external classification model approach can be seen as fitting a data distribution discriminant formula, and every piece of text data gets a result of the distribution discriminant formula. Based on this method, for text data without any labels, a large number of models previously trained with external data can be used to label the text data, and then classify documents based on these labels.

In an embodiment, long text documents represented by multiple labels can also be expressed as a feature matrix of one-hot vectors. After obtaining this feature matrix, the text matching problem associated with long text documents is converted to a feature matrix alignment problem in machine learning. The system 200 can be used to implement unlabeled sample training and learning, and quickly build the baseline classification model 210. Thus, the system 200 uses the pre-trained models to obtain tag or label lists from the collected documents, and creates a baseline classification algorithm for document classification based on the generated label lists. It should be noted that the system 200 can be applied by cold-started computer systems to generate the baseline classification algorithm.

Figure 3:
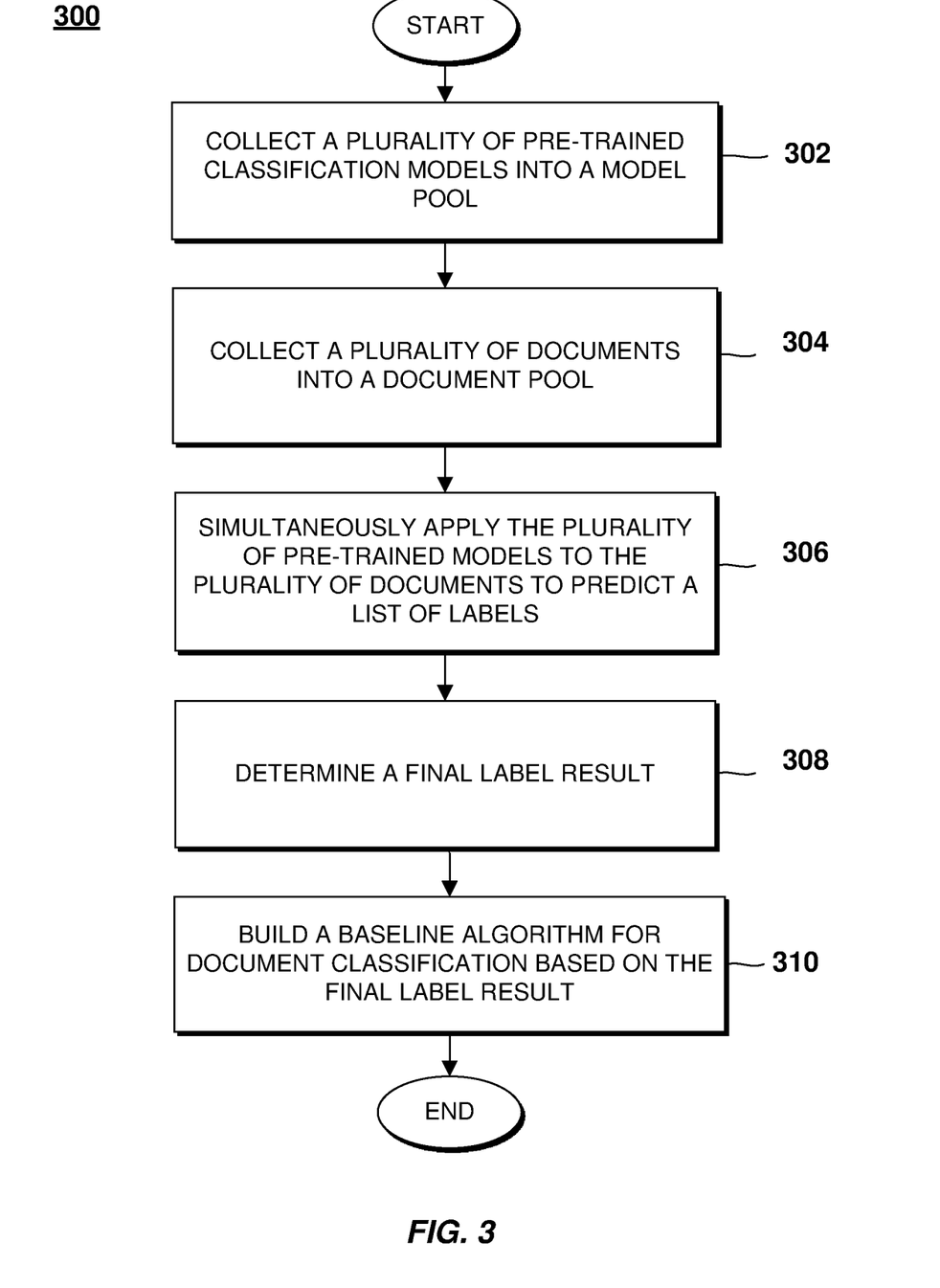
FIG. 3 depicts a flowchart illustrating the steps of a computer-implemented method for label-based document classification, according to an embodiment of the present disclosure.

Referring now to FIG. 3, a flowchart illustrating the steps of a computer-implemented method for label-based document classification is shown, according to an embodiment of the present disclosure.

The process starts at step 302 with the collection of a plurality of pre-trained classification models (hereinafter "pre-trained classification models"). The collected pre-trained classification models are stored in a pre-trained model pool. At step 304, a plurality of documents (hereinafter "documents") are collected and stored in a document pool. At step 306, the collected documents are used by the pre-trained classification models to generate a list of labels. The pre-trained classification models are simultaneously applied to the documents in the document pool.

At step 308, based on the list of labels, a final label result is obtained by using a word length N as a sliding window to obtain text data from the documents in the document pool. As previously explained, since the pre-trained models have an input length limitation, the sliding window with word length N is used to obtain text data from the documents, and generate the label list for a document. In an embodiment, the final label result can be determined by applying a weighted voting method to the label list obtained from the pre-trained models. The final label result is generated as a hard tag. In another embodiment a prediction value of all sliding windows can be retained to generate a soft tag. Stated differently, the label list obtained from the pre-trained models can be used as the soft tag.

At step 310, a baseline classification algorithm can be generated for document classification based on the determined final label result. The list of labels is converted into a feature matrix including one or more one-hot vectors. A length of a one-vector in the one or more one-hot vectors is aligned with a longest label dimension of all labels in the list of labels.

Therefore, embodiments of the present disclosure provide a method, system and computer program product to, among other things, generate a label-based document classification model based on an external model perspective that may allow computer systems to accurately identify and classify different types of documents and extract key data without delays associated with cold-start problems.

Figure 4:
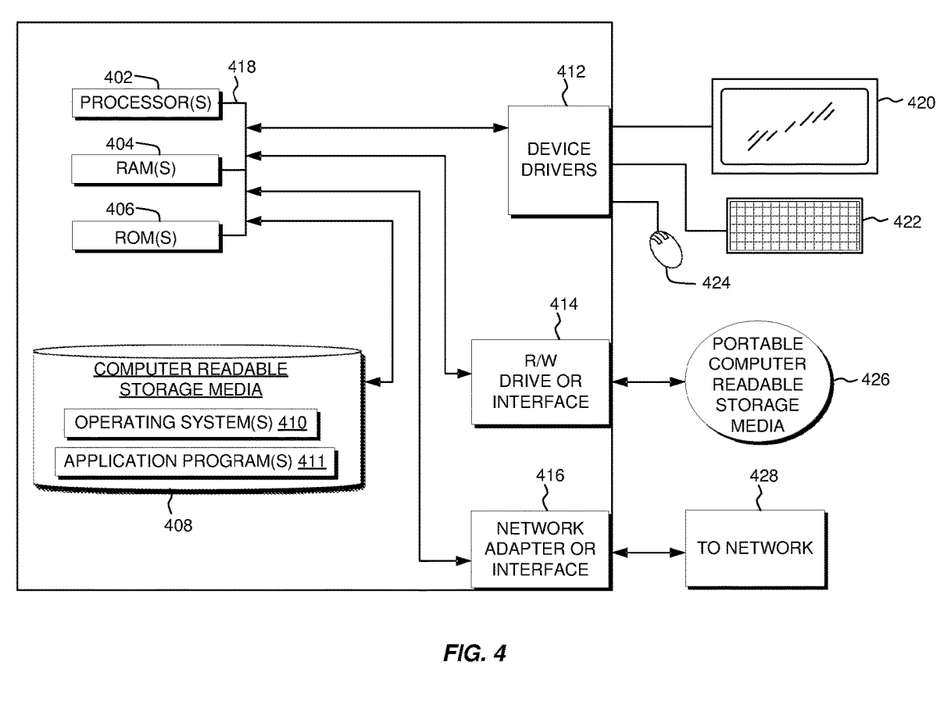
FIG. 4 is a block diagram of internal and external components of a computer system, according to an embodiment of the present disclosure.

Referring now to FIG. 4, a block diagram of components of client computer 102 and server computer 114 of networked computer environment 100 of FIG. 1 is shown, according to an embodiment of the present disclosure. It should be appreciated that FIG. 4 provides only an illustration of one implementation and does not imply any limitations regarding the environments in which different embodiments may be implemented. Many modifications to the depicted environment may be made.

Client computer 102 and server computer 114 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computer 102 and server computer 114 may also include a R/W drive or interface 414 to read from and write to one or more portable computer readable storage media 426. Application programs 411 on client computer 102 and server computer 114 may be stored on one or more of the portable computer readable storage media 426, read via the respective R/W drive or interface 414 and loaded into the respective computer readable storage media 408.

Client computer 102 and server computer 114 may also include a network adapter or interface 416, such as a TCP/IP adapter card or wireless communication adapter (such as a 4G wireless communication adapter using OFDMA technology) for connection to a network 428. Application programs 411 on client computer 102 and server computer 114 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Client computer 102 and server computer 114 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may include hardware and software (stored on computer readable storage media 408 and/or ROM 406).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
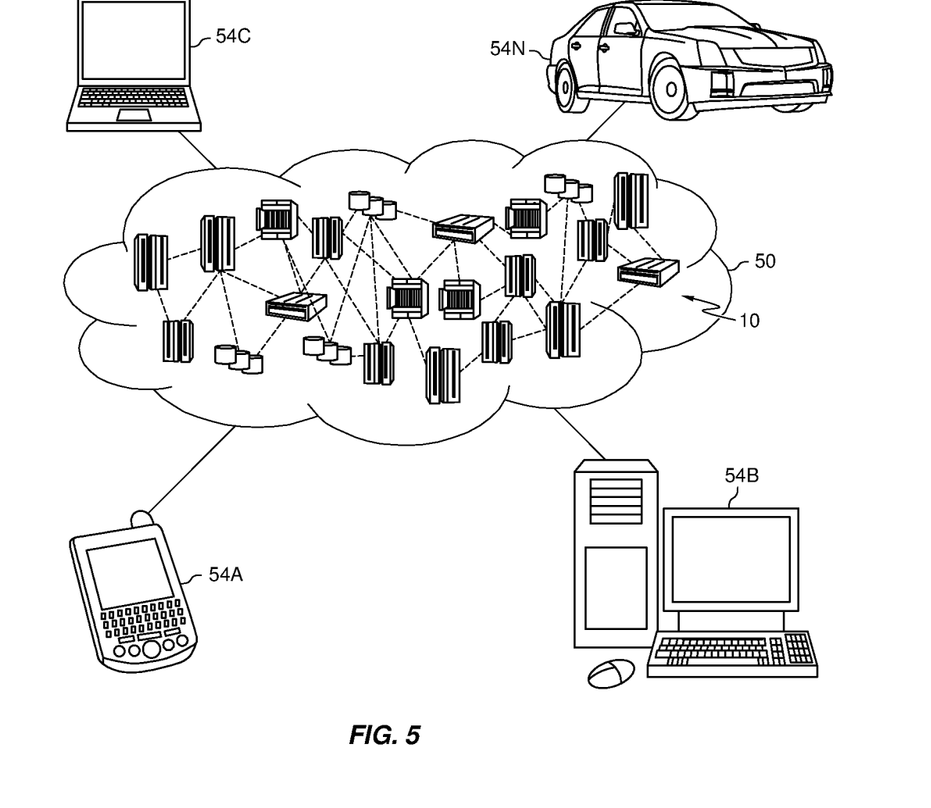
FIG. 5 is a block diagram of an illustrative cloud computing environment, according to an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
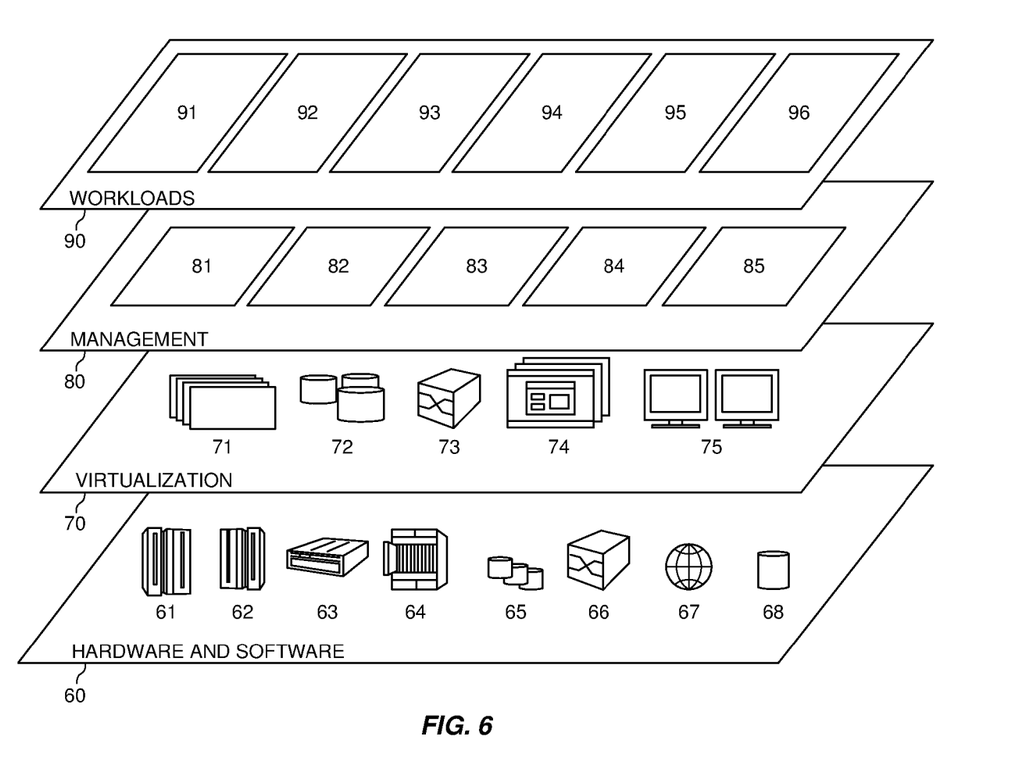
FIG. 6 is a block diagram of functional layers of the illustrative cloud computing environment of FIG. 5, according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for label-based document classification 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for document classification comprising:
    collecting, by one or more processors, a plurality of pre-trained classification models into a model pool;
    collecting, by the one or more processors, a plurality of documents into a document pool;
    applying in parallel, by the one or more processors, the collected plurality of pre-trained classification models to the plurality of documents in the document pool to simultaneously generate a list of labels for document classification rather than generating one label at a time;
    applying, by the one or more processors, a weighted voting method to the list of labels for optimizing weights of base classifiers;
    based on a weighted voting combination rule, determining, by the one or more processors, a final label result from the list of labels; and
    building, by the one or more processors, a baseline algorithm for document classification based on the determined final label result.

2. The method of claim 1, wherein predicting the list of labels further comprises:
    using, by the one or more processors, a word length N as a sliding window to obtain text data from the plurality of documents.

3. The method of claim 1, wherein the final label result is generated as a hard tag.

4. The method of claim 1, wherein determining the final label result further comprises:
    retaining, by the one or more processors, a prediction value of the sliding window to generate a soft tag.

5. The method of claim 1, wherein building the baseline algorithm further comprises:
    converting, by the one or more processors, the list of labels into a feature matrix comprising one or more one-hot vectors.

6. The method of claim 5, wherein a length of a one-vector in the one or more one-hot vectors is aligned with a longest label dimension of all labels in the list of labels.

7. A computer system for document classification, comprising:
    one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

collecting, by one or more processors, a plurality of pre-trained classification models into a model pool;

collecting, by the one or more processors, a plurality of documents into a document pool;

applying in parallel, by the one or more processors, the collected plurality of pre-trained classification models to the plurality of documents in the document pool to simultaneously generate a list of labels for document classification rather than generating one label at a time;

applying, by the one or more processors, a weighted voting method to the list of labels for optimizing weights of base classifiers;

based on a weighted voting combination rule, determining, by the one or more processors, a final label result from the list of labels; and building, by the one or more processors, a baseline algorithm for document classification based on the determined final label result.

8. The computer system of claim 7, wherein predicting the list of labels further comprises:

using, by the one or more processors, a word length N as a sliding window to obtain text data from the plurality of documents.

9. The computer system of claim 7, wherein the final label result is generated as a hard tag.

10. The computer system of claim 7, wherein determining the final label result further comprises:

retaining, by the one or more processors, a prediction value of the sliding window to generate a soft tag.

11. The computer system of claim 7, wherein building the baseline algorithm further comprises:

converting, by the one or more processors, the list of labels into a feature matrix comprising one or more one-hot vectors.

12. The computer system of claim 11, wherein a length of a one-vector in the one or more one-hot vectors is aligned with a longest label dimension of all labels in the list of labels.

13. A computer program product for document classification, comprising:

one or more computer readable storage media, and program instructions collectively stored on the one or more computer readable storage media, the program instructions comprising:

program instructions to collect, by one or more processors, a plurality of pre-trained classification models into a model pool;

program instructions to collect, by the one or more processors, a plurality of documents into a document pool;

program instructions to apply in parallel, by the one or more processors, the collected plurality of pre-trained classification models to the plurality of documents in the document pool to simultaneously generate a list of labels for document classification rather than generating one label at a time;

program instruction to apply, by the one or more processors, a weighted voting method to the list of labels for optimizing weights of base classifiers;

based on a weighted voting combination rule, program instructions to determine, by the one or more processors, a final label result from the list of labels; and program instructions to build, by the one or more processors, a baseline algorithm for document classification based on the determined final label result.

14. The computer program product of claim 13, wherein predicting the list of labels further comprises:

using, by the one or more processors, a word length N as a sliding window to obtain text data from the plurality of documents.

15. The computer program product of claim 13, wherein the final label result is generated as a hard tag.

16. The computer program product of claim 13, wherein determining the final label result further comprises:

retaining, by the one or more processors, a prediction value of the sliding window to generate a soft tag.

17. The computer program product of claim 13, wherein building the baseline algorithm further comprises:

converting, by the one or more processors, the list of labels into a feature matrix comprising one or more one-hot vectors, wherein a length of a one-vector in the one or more one-hot vectors is aligned with a longest label dimension of all labels in the list of labels.

* * * * *